(12) United States Patent
Mann et al.

(10) Patent No.: US 11,086,039 B2
(45) Date of Patent: Aug. 10, 2021

(54) CONNECTOR FOR LANYARD ATTACHMENT OF SEISMIC NODE TO CABLE

(71) Applicant: Fairfield Industries Incorporated, Houston, TX (US)

(72) Inventors: Chance Mann, Magnolia, TX (US); Mike Shirley, Katy, TX (US)

(73) Assignee: FAIRFIELD INDUSTRIES, INC., Houston, TX (US)

( * ) Notice: Subject to any disclaimer, the term of this patent is extended or adjusted under 35 U.S.C. 154(b) by 398 days.

(21) Appl. No.: 16/240,523

(22) Filed: Jan. 4, 2019

(65) Prior Publication Data

US 2020/0217981 A1 Jul. 9, 2020

(51) Int. Cl.
| | | |
|---|---|---|
| *G01V 1/38* | (2006.01) | |
| *H01R 13/523* | (2006.01) | |
| *G01V 1/20* | (2006.01) | |
| *H01R 13/627* | (2006.01) | |

(52) U.S. Cl.
CPC ............ *G01V 1/3852* (2013.01); *G01V 1/202* (2013.01); *G01V 1/3808* (2013.01); *H01R 13/523* (2013.01); *H01R 13/6278* (2013.01); *H01R 2201/14* (2013.01)

(58) Field of Classification Search
CPC .... G01V 1/3852; G01V 1/202; G01V 1/3808; H01R 13/523; H01R 13/6278; H01R 2201/14
See application file for complete search history.

(56) References Cited

U.S. PATENT DOCUMENTS

| | | | |
|---|---|---|---|
| 9,846,250 B2 | 12/2017 | Rokkan et al. | |
| 2010/0054079 A1* | 3/2010 | Thompson | H01R 13/533 367/20 |
| 2011/0051550 A1* | 3/2011 | Lindberg | G01V 1/247 367/20 |
| 2013/0263410 A1* | 10/2013 | Woodard | F16G 15/04 24/115 R |
| 2013/0266366 A1* | 10/2013 | Woodard | G01V 1/202 403/300 |
| 2014/0348590 A1 | 11/2014 | Thompson et al. | |
| 2015/0330533 A1 | 11/2015 | Nakovski et al. | |
| 2015/0331126 A1 | 11/2015 | Lambert et al. | |
| 2017/0017008 A1 | 1/2017 | Henman et al. | |
| 2017/0139070 A1* | 5/2017 | Marc | G01V 1/3852 |

(Continued)

FOREIGN PATENT DOCUMENTS

WO WO-03/033340 A1 4/2003

OTHER PUBLICATIONS

International Search Report and Written Opinion for PCT/US2020/012061 dated Apr. 30, 2020 (15 pages).

*Primary Examiner* — Ian J Lobo
(74) *Attorney, Agent, or Firm* — Foley & Lardner LLP

(57) ABSTRACT

Systems and methods of deploying seismic data acquisition units from a marine vessel are disclosed. The system can include a mechanical attachment device comprising a cavity formed by interlocking a first member and a second member. Protrusions located on the first member and second member can increase the coefficient of friction between a rope and the mechanical attachment device responsive to an increase in tension on the rope. A lanyard can couple a seismic data acquisition unit to the mechanical attachment device.

19 Claims, 12 Drawing Sheets

(56) References Cited

U.S. PATENT DOCUMENTS

| | | |
|---|---|---|
| 2018/0100940 A1 | 4/2018 | Rokkan et al. |
| 2018/0341033 A1 | 11/2018 | Olivier et al. |
| 2019/0063672 A1* | 2/2019 | Olivier ................ G01V 1/3843 |

* cited by examiner

CONNECTOR FOR LANYARD ATTACHMENT OF SEISMIC NODE TO CABLE

BACKGROUND

A seismic data acquisition system can acquire seismic data relating to subsurface features, such as lithological formations or fluid layers that may indicate the presence of hydrocarbons, minerals or other elements. An acoustic signal can penetrate the surface of the earth. The acoustic signal can reflect or refract off of subsurface lithological formations. The reflected or refracted acoustic signals can be acquired, analyzed, and interpreted to indicate physical characteristics of, for example, the lithological formations such as the presence of hydrocarbons.

SUMMARY

At least one aspect is directed to a system to deploy seismic data acquisition units from a marine vessel. The system can include a mechanical attachment device. The mechanical attachment device can include a member coupled to a second member via a pin. The mechanical attachment device can include a cavity formed by interlocking the first member and the second member, the cavity to receive a cable that extends through the cavity. The mechanical attachment device can include a first protrusion in the cavity. The mechanical attachment device can include second protrusion in the cavity and located a distance from the first protrusion. The mechanical attachment device can include a third protrusion in the cavity between the first protrusion and the second protrusion. The protrusions can increase a coefficient of friction between the cable and the mechanical attachment device responsive to an increase in tension on the cable. The mechanical attachment device can include an opening that extends away from a portion of the mechanical attachment device. The opening can receive a lanyard. The lanyard can couple a seismic acquisition device to the mechanical attachment device via the opening.

At least one aspect is directed to a method of deploying seismic data acquisition units from a marine vessel. The method can include providing a mechanical attachment device. The mechanical attachment device can include a member coupled to a second member via a pin. The mechanical attachment device can include a cavity formed by interlocking the first member and the second member, the cavity to receive a cable that extends through the cavity. The mechanical attachment device can include a first protrusion in the cavity. The mechanical attachment device can include second protrusion in the cavity and located a distance from the first protrusion. The mechanical attachment device can include a third protrusion in the cavity between the first protrusion and the second protrusion. The protrusions can increase a coefficient of friction between the cable and the mechanical attachment device responsive to an increase in tension on the cable. The mechanical attachment device can include an opening that extends away from a portion of the mechanical attachment device. The opening can receive a lanyard. The method can include attaching the mechanical attachment device to the cable. The method can include coupling the lanyard to the mechanical attachment device via the opening of the mechanical attachment device. The method can include attaching a seismic data acquisition unit to the lanyard. The method can include deploying the seismic data acquisition unit into the aqueous environment.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
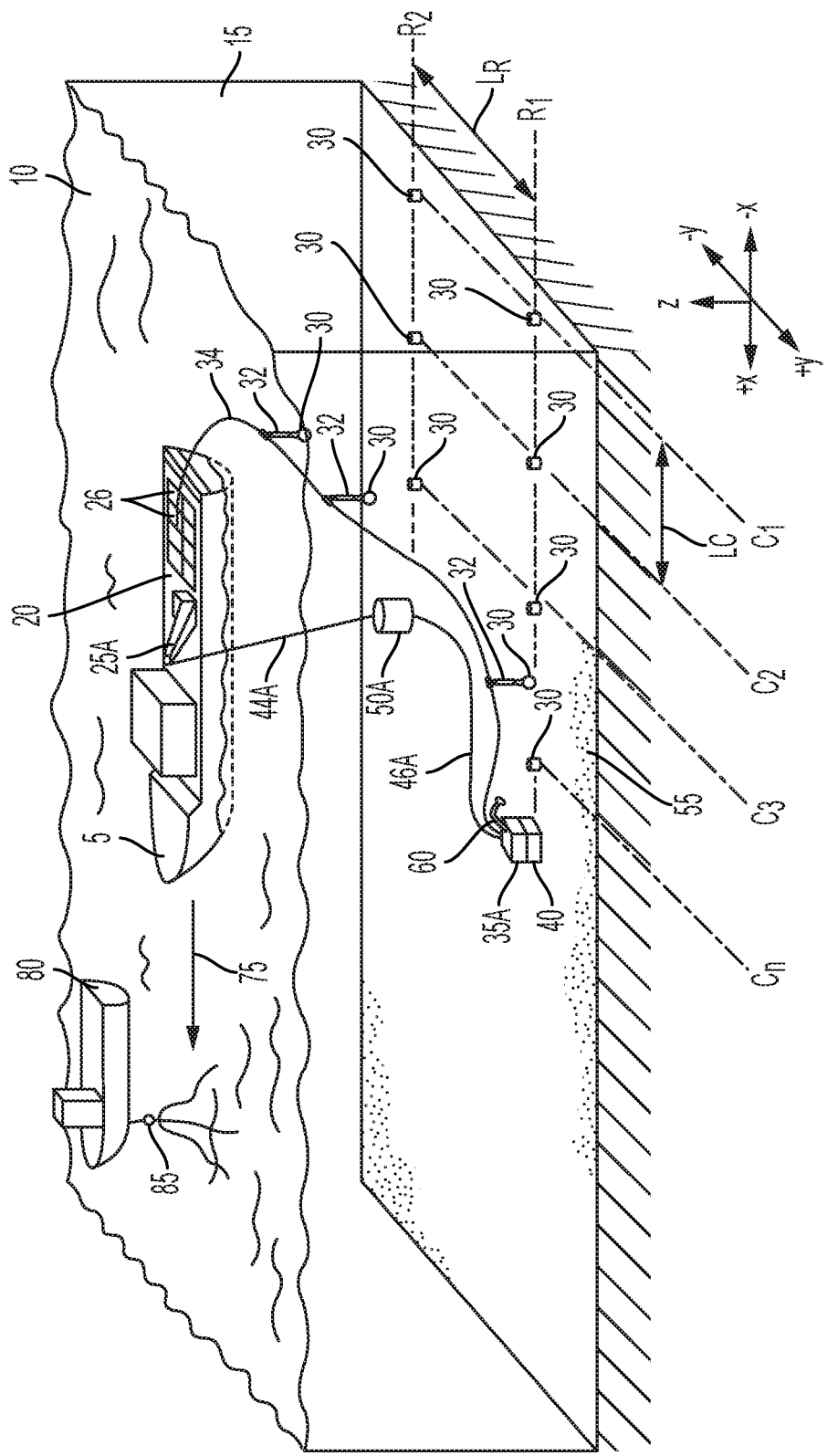
FIG. 1 depicts an isometric schematic view of an implementation of a seismic operation in deep water.

Following below are more detailed descriptions of various concepts related to, and implementations of, methods, apparatuses, and systems of automating back deck operations to deploy seismic data acquisition units from a marine vessel. The seismic data acquisition units, for example, can attach to a lanyard. The lanyard can attach to a mechanical attachment device. The mechanical attachment device can be coupled to a deployment cable. The mechanical attachment device, along with the lanyard and seismic data acquisition unit, can be deployed from the marine vessel and into an aqueous medium. The various concepts introduced above and discussed in greater detail below may be implemented in any of numerous ways, as the described concepts are not limited to any particular manner of implementation.

In a sub-marine seismic data acquisition system a series of seismic data acquisition units (e.g., nodes) can be deployed from a marine vessel onto a seabed or lakebed. An acoustic signal can be propagated from a source through the water column and can pass the seabed and enter (e.g., "down") into the earth. The acoustic signal can reflect or refract off of various lithological formations back (e.g., "up") toward the surface of the earth. The seismic data acquisition units deployed on the seabed can acquire the reflected or refracted acoustic signals.

An extraction vehicle, such as an autonomous or remote underwater vehicle, or other entity such as a vessel on the surface of the body of water can wirelessly or optically communicate with the seismic data acquisition units deployed on a seabed or other surface of the earth to extract the acquired seismic data. The systems and methods described herein relate to techniques used to deploy the seismic data acquisition units from the marine vessel and into the aqueous medium. For example, there can be hundreds or thousands of seismic data acquisition units stored on a marine vessel. It can be challenging to timely deploy the hundreds or thousands of seismic data acquisition units and position them on a seabed. For example, it can be challenging due to the size or weight of the seismic data acquisition units, the manner in which the seismic data acquisition units are to be handled to mitigate the risk of damaging sensitive components in the seismic data acquisition units, the limited space on the deck of the marine vessel, or the limited resources available to deploy the seismic data acquisition units.

The systems and methods of the present technical solution can facilitate deploying the seismic data acquisition units from the marine vessel into the aqueous medium so they can be positioned on a seabed, in a symmetrical array pattern, other pattern, or random deployment. For example, systems and methods of the present technical solution can automate certain back deck operations to deploy seismic data acquisition units from a marine vessel. The present solution can include a mechanical attachment device coupled to a deployment cable. Protrusions on the mechanical attachment device can increase the coefficient of friction between the cable and the mechanical attachment device responsive to an increase in tension on the cable when the seismic acquisition units are deployed. The reduced tension on the cable while the cable, mechanical attachment device and seismic acquisition unit are being handled on the vessel allow for positioning and reposition of the mechanical attachment devices on the cable.

Thus, systems and methods of the present disclosure can partially or fully automate one or more aspect, component or function on a back deck of a marine vessel to deploy seismic data acquisition units into an aqueous medium, or retrieve seismic data acquisition units from the aqueous medium.

FIG. 1 is an isometric schematic view of an implementation of a seismic operation in deep water facilitated by a first marine vessel 5. FIG. 1 is a non-limiting illustrative example of a marine environment in which the systems and methods of the present disclosure can deploy or retrieve seismic data acquisition units.

By way of example, FIG. 1 illustrates a first vessel 5 positioned on a surface 10 of a water column 15 and includes a deck 20 which supports operational equipment. At least a portion of the deck 20 includes space for the deployment system 26, a plurality of sensor device racks, the system 200, the system 500, the system 600, the system 700, the system 900, the system 1200, the system 1300, the system 1500, the system 2000 or one or more components depicted in FIGS. 2-20. The sensor device racks may also include data retrieval devices or sensor recharging devices.

The deck 20 also includes one or more cranes 25A attached thereto to facilitate transfer of at least a portion of the operational equipment, such as an ROV, from the deck 20 to the water column 15. For example, a crane 25A coupled to the deck 20 is configured to lower and raise an ROV 35A, which transfers and positions one or more sensor devices 30 on a seabed 55. The seabed 55 can include a lakebed 55, ocean floor 55, or earth 55. The ROV 35A is coupled to the first vessel 5 by a tether 46A and an umbilical cable 44A that provides power, communications, and control to the ROV 35A. A tether management system (TMS) 50A is also coupled between the umbilical cable 44A and the tether 46A. The TMS 50A may be utilized as an intermediary, subsurface platform from which to operate the ROV 35A. For most ROV 35A operations at or near the seabed 55, the TMS 50A can be positioned approximately 50 feet above seabed 55 and can pay out tether 46A as needed for ROV 35A to move freely above seabed 55 in order to position and transfer seismic sensor devices 30 thereon.

A crane 25B may be coupled (e.g., via a latch, anchor, nuts and bolts, screw, suction cup, magnet, or other fastener) to a stern of the first vessel 5, or other locations on the first vessel 5. Each of the cranes 25A, 25B may be any lifting device or launch and recovery system (LARS) adapted to operate in a marine environment. The cable 34 can be an umbilical, a tether, a cord, a wire, a rope, and the like, that is configured to supply, support, transfer, convey, transport or retrieve seismic data acquisition units 30.

The ROV 35A can include a seismic sensor device storage compartment 40 that is configured to store one or more seismic sensor devices 30 therein for a deployment or retrieval operation. The storage compartment 40 may include a magazine, a rack, or a container configured to store the seismic sensor devices. The storage compartment 40 may also include a conveyor, such as a movable platform having the seismic sensor devices thereon, such as a carousel or linear platform configured to support and move the seismic sensor devices 30 therein. In one implementation, the seismic sensor devices 30 may be deployed on the seabed 55 and retrieved therefrom by operation of the movable platform. The ROV 35A may be positioned at a predetermined location above or on the seabed 55 and seismic sensor devices 30 are rolled, conveyed, or otherwise moved out of the storage compartment 40 at the predetermined location. The seismic sensor devices 30 may be deployed and retrieved from the storage compartment 40 by a robotic device 60, such as a robotic arm, an end effector or a manipulator, disposed on the ROV 35A.

The seismic sensor device 30 may be referred to as seismic data acquisition unit 30 or node 30. The seismic data acquisition unit 30 can record seismic data. The seismic data acquisition unit 30 may include one or more of at least one geophone, at least one hydrophone, at least one power source (e.g., a battery, external solar panel), at least one clock, at least one tilt meter, at least one environmental sensor, at least one seismic data recorder, at least global positioning system sensor, at least one wireless or wired transmitter, at least one wireless or wired receiver, at least one wireless or wired transceiver, or at least one processor. The seismic sensor device 30 may be a self-contained unit such that all electronic connections are within the unit, or one or more components can be external to the seismic sensor device 30. During recording, the seismic sensor device 30 may operate in a self-contained manner such that the node does not require external communication or control. The seismic sensor device 30 may include several geophones and hydrophones configured to detect acoustic waves that are reflected by subsurface lithological formation or hydrocarbon deposits. The seismic sensor device 30 may further include one or more geophones that are configured to vibrate the seismic sensor device 30 or a portion of the seismic sensor device 30 in order to detect a degree of coupling between a surface of the seismic sensor device 30 and a ground surface. One or more component of the seismic sensor device 30 may attach to a gimbaled platform having multiple degrees of freedom. For example, the clock may be attached to the gimbaled platform to minimize the effects of gravity on the clock.

Using the cable 34 to transfer seismic sensor devices 30 to the ROV 35A at a subsurface location reduces the time required to place the seismic sensor devices 30 on the seabed 55, or "planting" time, as the ROV 35A is not raised and lowered to the surface 10 for seismic sensor device reloading. Further, mechanical stresses placed on equipment utilized to lift and lower the ROV 35A are minimized as the ROV 35A may be operated below the surface 10 for longer periods. The reduced lifting and lowering of the ROV 35A may be particularly advantageous in foul weather or rough sea conditions. Thus, the lifetime of equipment may be enhanced as the ROV 35A and related equipment are not raised above surface 10, which may cause the ROV 35A and related equipment to be damaged, or pose a risk of injury to the vessel personnel.

Likewise, in a retrieval operation, the ROV 35A can utilize commands from personnel on the first vessel 5 to retrieve each seismic sensor device 30 that was previously placed on seabed 55. The retrieved seismic sensor devices 30 are placed into the storage compartment 40 of the ROV 35A. The ROV 35A can be sequentially positioned adjacent each seismic sensor device 30 on the seabed 55 and the seismic sensor devices 30 are rolled, conveyed, or otherwise moved from the seabed 55 to the storage compartment 40. The seismic sensor devices 30 can be retrieved from the seabed 55 by a robotic device 60 disposed on the ROV 35A.

The first vessel 5 can travel in a first direction 75, such as in the +X direction, which may be a compass heading or other linear or predetermined direction. The first direction 75 may also account for or include drift caused by wave action, current(s) or wind speed and direction. The plurality of seismic sensor devices 30 can be placed on the seabed 55 in selected locations, such as a plurality of rows Rn in the X direction (R1 and R2 are shown) or columns Cn in the Y direction (C1-Cn are shown), wherein n equals an integer. The rows Rn and columns Cn can define a grid or array, wherein each row Rn (e.g., R1-R2) comprises a receiver line in the width of a sensor array (X direction) or each column Cn comprises a receiver line in a length of the sensor array (Y direction). The distance between adjacent sensor devices 30 in the rows is shown as distance LR and the distance between adjacent sensor devices 30 in the columns is shown as distance LC. While a substantially square pattern is shown, other patterns may be formed on the seabed 55. Other patterns include non-linear receiver lines or non-square patterns. The pattern(s) may be predetermined or result from other factors, such as topography of the seabed 55. The distances LR and LC can be substantially equal and may include dimensions between about 60 meters to about 400 meters, or greater. The distance between adjacent seismic sensor devices 30 may be predetermined or result from topography of the seabed 55 as described above.

The first vessel 5 is operated at a speed, such as an allowable or safe speed for operation of the first vessel 5 and any equipment being towed by the first vessel 5. The speed may take into account any weather conditions, such as wind speed and wave action, as well as currents in the water column 15. The speed of the vessel may also be determined by any operations equipment that is suspended by, attached to, or otherwise being towed by the first vessel 5. For example, the speed can be limited by the drag coefficients of components of the ROV 35A, such as the TMS 50A and umbilical cable 44A, as well as any weather conditions or currents in the water column 15. As the components of the ROV 35A are subject to drag that is dependent on the depth of the components in the water column 15, the first vessel speed may operate in a range of less than about 1 knot. When two receiver lines (rows R1 and R2) are being laid, for example, the first vessel includes a first speed of between about 0.2 knots and about 0.6 knots. The first speed can include an average speed of between about 0.25 knots, which includes intermittent speeds of less than 0.25 knots and speeds greater than about 1 knot, depending on weather conditions, such as wave action, wind speeds, or currents in the water column 15.

During a seismic survey, one receiver line, such as row R1 may be deployed. When the single receiver line is completed a second vessel 80 can be used to provide a source signal. In some cases, the first vessel or other device can provide the source signal. The second vessel 80 is provided with a source device or acoustic source device 85, which may be a device capable of producing acoustical signals or vibrational signals suitable for obtaining the survey data. The source signal propagates to the seabed 55 and a portion of the signal is reflected back to the seismic sensor devices 30. The second vessel 80 may be required to make multiple passes, for example at least four passes, per a single receiver line (row R1 in this example). During the time the second vessel 80 is making the passes, the first vessel 5 continues deployment of a second receiver line. However, the time involved in making the passes by the second vessel 80 is much shorter than the deployment time of the second receiver line. This causes a lag time in the seismic survey as the second vessel 80 sits idle while the first vessel 5 is completing the second receiver line.

The first vessel 5 can use one ROV 35A to lay sensor devices to form a first set of two receiver lines (rows R1 and R2) in any number of columns, which may produce a length of each receiver line of up to and including several miles. The two receiver lines (rows R1 and R2) can be substantially (e.g., +/−10%) parallel. When a single directional pass of the first vessel 5 is completed and the first set (rows R1, R2) of seismic sensor devices 30 are laid to a predetermined length, the second vessel 80, provided with the source device 85, is utilized to provide the source signal. The second vessel 80 can make eight or more passes along the two receiver lines to complete the seismic survey of the two rows R1 and R2.

While the second vessel 80 is shooting along the two rows R1 and R2, the first vessel 5 may turn 180 degrees and travel in the X direction in order to lay seismic sensor devices 30 in another two rows adjacent the rows R1 and R2, thereby forming a second set of two receiver lines. The second vessel 80 may then make another series of passes along the second set of receiver lines while the first vessel 5 turns 180 degrees to travel in the +X direction to lay another set of receiver lines. The process may repeat until a specified area of the seabed 55 has been surveyed. Thus, the idle time of the second vessel 80 is minimized as the deployment time for laying receiver lines is cut approximately in half by deploying two rows in one pass of the vessel 5.

Although only two rows R1 and R2 are shown, the sensor device 30 layout is not limited to this configuration as the ROV 35A may be adapted to layout more than two rows of sensor devices in a single directional tow. For example, the ROV 35A may be controlled to lay out between three and six rows of sensor devices 30, or an even greater number of rows in a single directional tow. The width of a "one pass" run of the first vessel 5 to layout the width of the sensor array can be limited by the length of the tether 46A or the spacing (distance LR) between sensor devices 30.

Figure 2:
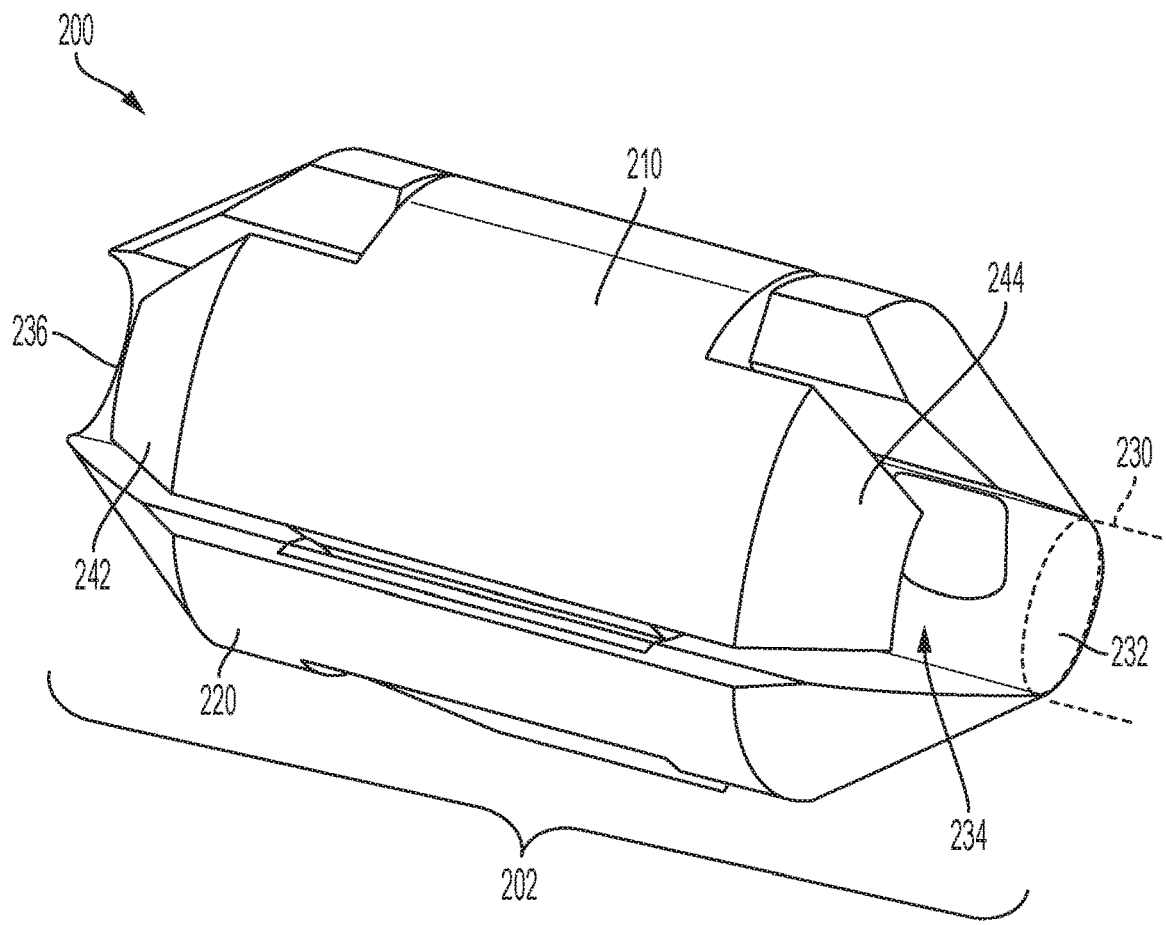
FIGS. 2-4 depict a mechanical attachment device of a system to deploy seismic data acquisition units from a marine vessel, in accordance with some implementations.

FIG. 2 depicts a mechanical attachment device of a system to deploy seismic data acquisition units from a marine vessel. The system 200 can include a mechanical attachment device 202. The mechanical attachment device 202 can include a first member 210 coupled to a second member 220. The first member 210 and the second member 220 can form a cavity 234 (or opening) by bringing the first member 210 and the second member 220 together. Bringing the first member 210 and the second member 220 together can include interlocking, partially locking, or touching the first member 210 and the second member 220. For example, an operator or robotic arm on the back deck can bring the first member 210 and the second member 220 together. The mechanical attachment device 202 can be coupled to a seismic data acquisition unit deployment cable (e.g., cable 34) that extends through the mechanical attachment device 202 via openings 232 and 236. A seismic data acquisition deployment cable 34 can also include a rope. The rope can lack an attachment feature on the rope. The mechanical attachment device 202 can be attached to the cable 34 prior to the deployment of the seismic acquisition device 30. The mechanical attachment device 202 can be removed from the cable 34 subsequent to the retrieval of the seismic acquisition device 30.

The mechanical attachment device 202 can include a first opening 236 at a first end 242 of the mechanical attachment device 202. The first opening 236 can be referred to as a first aperture. The mechanical attachment device 202 can include second opening 232 at a second end 244 of the mechanical attachment device 202. The second opening 232 can be referred to as a second aperture. In some cases, a seismic data acquisition unit deployment cable (e.g., cable 34) can extend through the first opening 236 at the first end 242 of the mechanical attachment device 202 and the second opening 232 at a second end 244 of the mechanical attachment device 202. The seismic data acquisition unit deployment cable 34 can extend from a spool that stores the cable on the marine vessel 5. The deployment cable 34 can be stored in a spool, reel, or other container. The marine vessel 5 can include a spool of cable 34 wherein the mechanical attachment device 30 is attached to the cable 34 as the cable 34 is reeled out.

Figure 3:
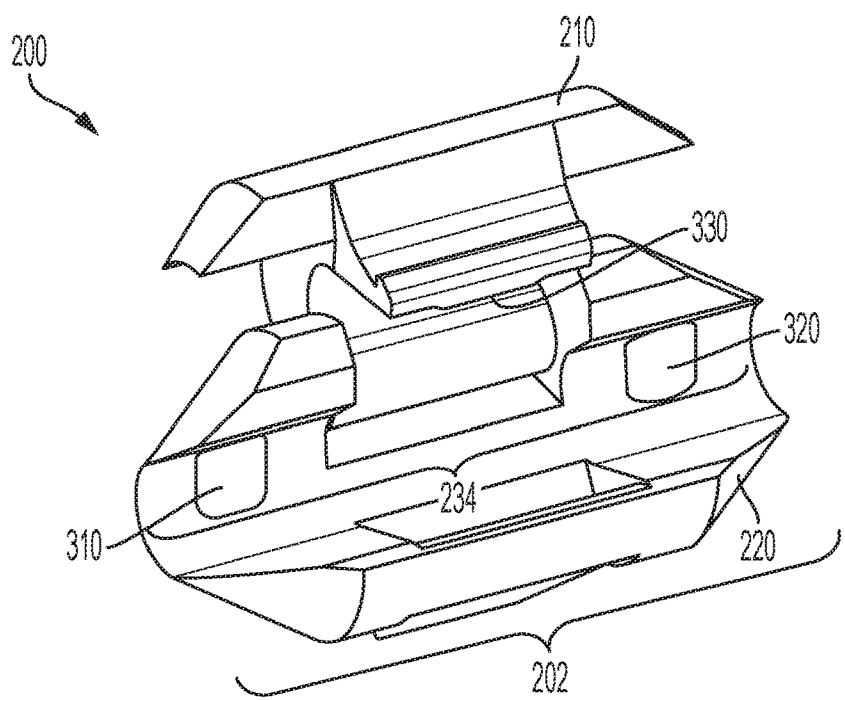

FIG. 3 depicts a mechanical attachment device of a system to deploy seismic data acquisition units from a marine vessel. The system 200 can include the mechanical attachment device 202 illustrated in FIG. 2. The mechanical attachment device 202 can include a first protrusion 310 located on a first portion of the second member 310, the first protrusion 310 disposed in the cavity 234. The mechanical attachment device 202 can include a second protrusion 320 location on a second portion of the second member 220, the second protrusion 320 disposed in the cavity 234. The second protrusion 320 can be separated from the first protrusion 310 by a distance. For example, the second protrusion 320 can be separated from the first protrusion 310 by a distance based on the length of the cavity 234 or some portion thereof (e.g., 90% of the length of the cavity 234, 80%, 70%, 60%, 50% or some other portion of the cavity 234). The mechanical attachment device 202 can include a third protrusion 330 located between the first protrusion 310 and the second protrusion 320. The third protrusion 330 can be located or disposed in the cavity 234 at a distance away from an axis formed by the first protrusion 310 and the second protrusion 320. For example, the third protrusion 330 can be separated from the first protrusion 310 and the second protrusion 320 by the entire diameter 230 or some portion thereof.

The mechanical attachment device 202 can include more than three protrusions. For example, the mechanical attachment device 202 can include a fourth protrusion between the first protrusion 310 and the second protrusion 320 on the same side as the third protrusion 330. The first protrusion 310, second protrusion 320, third protrusion 330, or any additional protrusions can be formed of the same or different material than the mechanical attachment device 202. The first protrusion 310, second protrusion 320, third protrusion 330, or any additional protrusions can be any shape or size. The first protrusion 310, second protrusion 320, third protrusion 330, or any additional protrusions can have a rectangular shape, square shape, triangular shape or other polygonal shape. Each of the protrusions can have a same shape, or have different shapes. The first protrusion 310, second protrusion 320, third protrusion 330, or any additional protrusions can have a circular shape, elliptical shape, or rounded or circular portion. The first protrusion 310, second protrusion 320, third protrusion 330, or any additional protrusions can extend from the mechanical attachment device 202 within the cavity 234 by a distance. For example, the first protrusion 310, second protrusion 320, third protrusion 330, or any additional protrusions can extend from the mechanical attachment device 202 by at least 0.05 inch, 0.1 inch, 0.15 inches, 0.2 inches, 0.25 inches, 0.3 inches or 0.35 inches or more.

The first protrusion 310, second protrusion 320, third protrusion 330, or any additional protrusions can be located in the opening 232. The dimensions of the first protrusion 310, second protrusion 320, third protrusion 330, or any additional protrusions can define at least a portion of the dimensions of the opening 232. For example, a length of an edge of the first protrusion 310, second protrusion 320, third protrusion 330, or any additional protrusions adjacent the opening 232 can be 1 inch, which can be located in the cavity 234 with a portion that is 1 inch. The first protrusion 310, second protrusion 320, third protrusion 330, or any additional protrusions can be separated from one another by a distance that forms the width of the opening 232. For example, the distance between the protrusions can be at least 0.05 inch, 0.1 inch, 0.15 inches, 0.2 inches, 0.25 inches, 0.3 inches or 0.35 inches or more. Thus, the width of the opening 232 can be at least 0.05 inch, 0.1 inch, 0.15 inches, 0.2 inches, 0.25 inches, 0.3 inches or 0.35 inches or more based on the distance between the first protrusion 310, second protrusion 320, third protrusion 330, or any additional protrusions. The opening 232 can have walls formed by the first protrusion 310, second protrusion 320, third protrusion 330, or any additional protrusions. The opening 232 can have an open end, such as an open end due to the absence of a protrusion. The opening 232 can have one or more open ends, or all ends can be closed.

Figure 4:
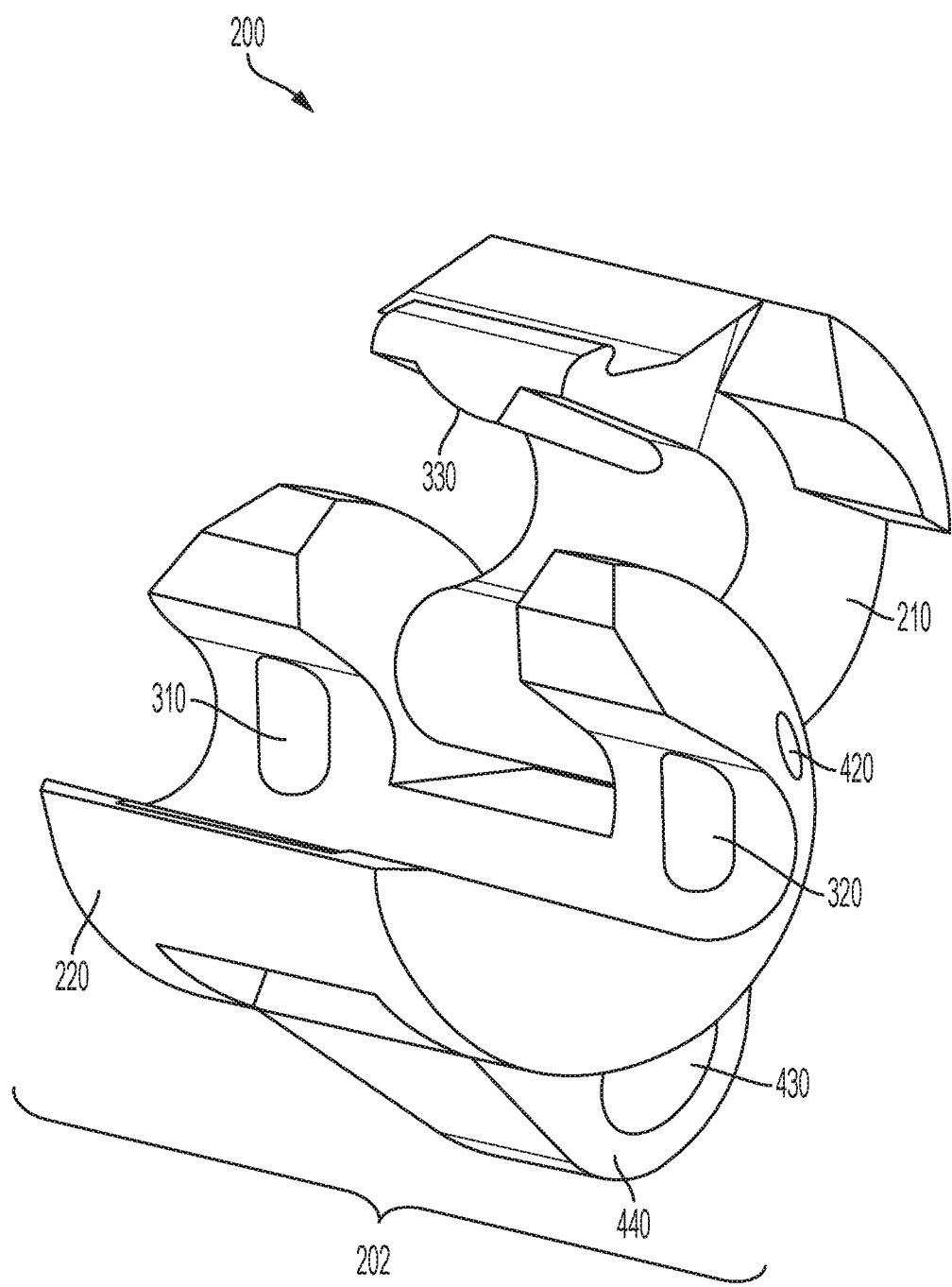

FIG. 4 depicts a mechanical attachment device of a system to deploy seismic data acquisition units from a marine vessel. The system 200 can include one or more component or function of the mechanical attachment device 202 illustrated in FIG. 2 and FIG. 3. The mechanical attachment device 202 can include a slot 420 running through the first member 210 and the second member 220. The slot can form an axis about which the first member 210 and the second member 220 pivot. The slot can house a pin (e.g., pin 510 depicted in FIGS. 5A-5C) that extends through the first member 210 and the second member 220. The first member 210 can be configured to pivot about an axis formed by the pin 510. The slot can be encapsulated or exposed to the exterior environment.

The mechanical attachment device 202 can include a lanyard loop 440. The lanyard loop 440 can be coupled to the mechanical attachment device 202 or the lanyard loop 440 can be part of the first member 210 or the second member 220. The lanyard loop can include an opening 430 that extends away from a portion of the mechanical attachment device 202 to receive a lanyard 32. The opening 430 can be configured to receive a lanyard 32. The opening can have a circular shape, elliptical shape, or any other shape. The opening 430 can extend from the first member 210 or the second member 220 by a distance. For example, the opening can extend from the first member 210 or the second member 220 by at least 0.1 inch, 0.2 inches, 0.3 inches, 0.4 inches, 0.5 inches, 0.6 inches, or more.

The lanyard 32 can include a cable or rope. The lanyard 32 can be rigid or flexible. The lanyard 32 can be a solid material. The lanyard 32 can be elastic. The lanyard 32 can include one or more materials, such as fibers, polymers, metals, alloys, wood, plastics, or ceramics. The lanyard 32 can include a non-rigid, flexible rope to reduce the transfer of vibration from the mechanical attachment device 202 to the seismic acquisition unit 30. For example, the transfer of vibration can be reduced by 10%, 20%, 30%, 40%, 50%, 60%, or more. The lanyard 32 can couple the seismic data acquisition unit 30 to a cable 34 via the mechanical attachment device 202 as depicted in FIG. 1.

The mechanical attachment device 202 and its components, such as the first end 242, second end 244, first member 210, second member 220, first protrusion 310, second protrusion 320, third protrusion 330, or lanyard loop 440 can be formed of one or more material. The one or more materials can be suitable for use in an aqueous environment. For example, material can include one or more of plastics, metals, fiberglass, PolyVinyl Chloride, steel, iron, composite materials, steel-reinforced cement, or aluminum. The mechanical attachment device 202 can include an exterior surface that is a continuous sheet of material, closed or non-porous. The surface of the mechanical attachment device 202 can include a porous structure. For example, the mechanical attachment device 202 can include perforations, holes, a mesh, a skeleton type structure, or a lattice structure. The mechanical attachment device 202 can be constructed to hold on to the cable 34. The mechanical attachment device 202 can be constructed with an internal surface that contacts the cable 34.

The mechanical attachment device 202 can couple to the cable 34 such that the first protrusion 310, second protrusion 320 and third protrusion 330 increase the coefficient of friction between the cable 34 responsive to an increase in tension on the cable 34. A diameter 320 (or other cross distance) of the first opening 236 can be sufficient to allow the cable 34 to traverse the opening 236. The diameter 320 of the first opening can be set or established such as the mechanical attachment device 202 slides freely along the cable 34 when there is a minimal or no tension on the cable 34. A minimal tension on the cable 34 can include a tension that is below a threshold of tension that does not result in enough friction between the first protrusion 310, second protrusion 320, and third protrusion 330 and the cable 34 so that the mechanical attachment device 202 grips onto the cable 34 and prevents the mechanical attachment device 202 from sliding or moving relative to the cable 34. Similarly, the second opening 236 can be set or established such as the mechanical attachment device 202 slides freely along the cable 34 when there is a minimal or no tension on the cable 34. The mechanical attachment device 202 can be configured to move freely along the cable 34 responsive to the tension in the cable 34 less than a threshold. The mechanical attachment device can be configured to lock to the cable 34 responsive to the tension in the rope greater than or equal to the threshold. The diameter 230 can be determined based on the diameter of the cable 34. For example, the diameter 230 can be the same as the diameter of the cable 34 or greater than the diameter of the cable 34 (e.g., at least 1% more, 2% more, 3% more, 4% more, 5% more, or 10% more than the diameter of the cable 1802). The cable 34 can be capable of being compressed. The cable 34 can be deformable by a certain degree (e.g., 1%, 2%, 3%, or more).

Figure 5A:
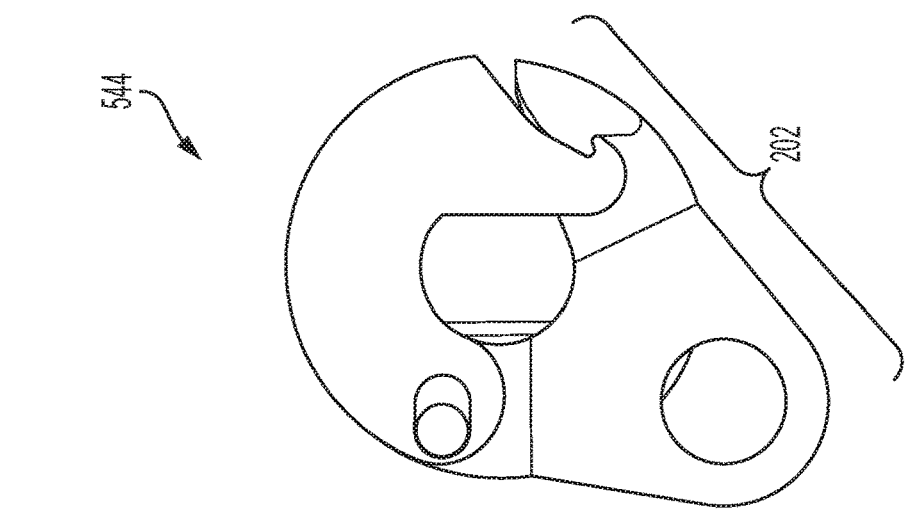
FIGS. 5A-5C depict a system to lock the mechanical attachment device.
Figure 5B:
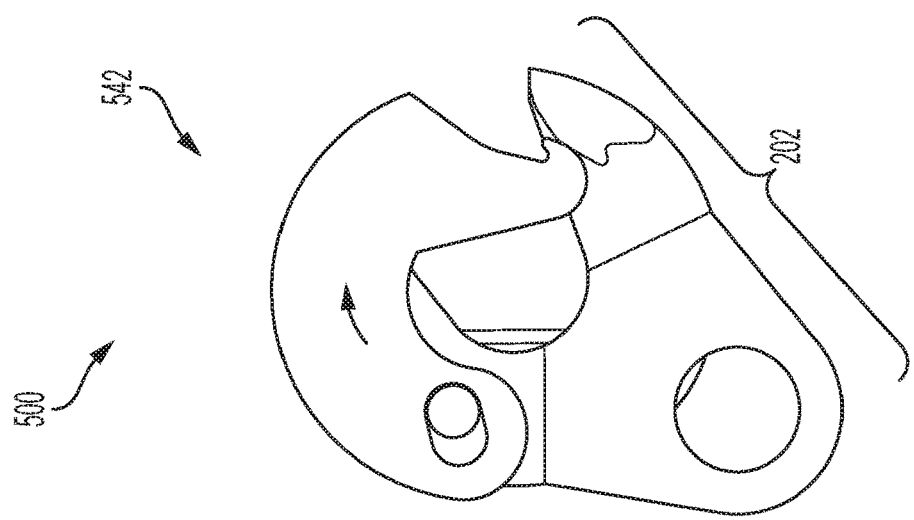
Figure 5C:
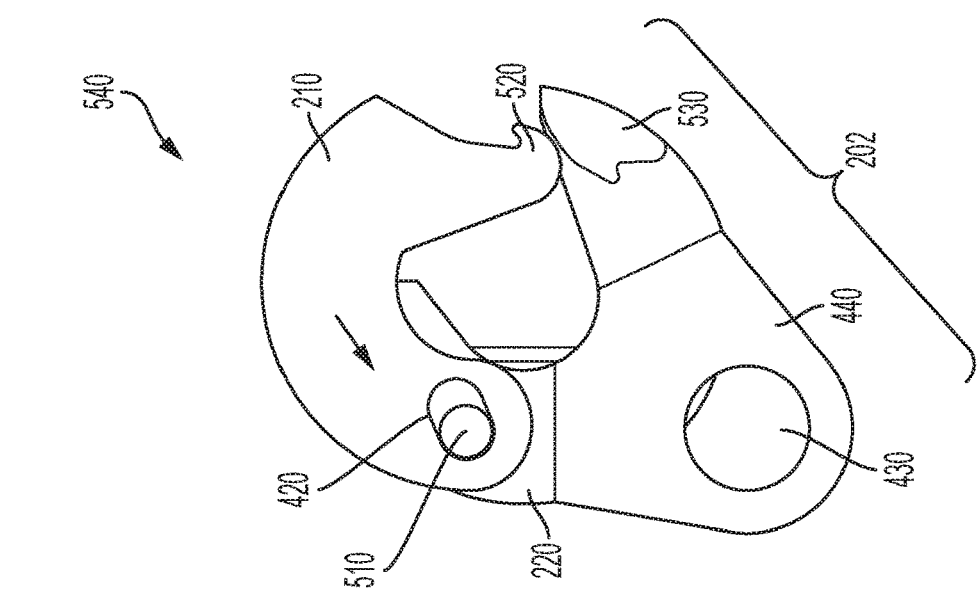

FIGS. 5A-5C depicts a system to lock the mechanical attachment device. The system 500 can include a mechanism to lock the mechanical attachment device 202. The system 500 can include the mechanical attachment device 202 illustrated in FIGS. 2-4. FIGS. 5A-5C can include a first locking member 520 and a second locking member 530. The first locking member 520 can be at the end of the first member 210 and the second locking member 530 can be at the end of the second member 220. The first locking member 520 can be configured to interlock with the second locking member 530. The first locking member 520 and the second locking member 530 can be removably or semi-permanently interlocked. Removably or semi-permanently locking or interlocking can refer to being able to lock and then unlock the first locking member 520 and the second locking member 530. The locking mechanism can include the mechanical attachment device 202 in a first unlocked position 540. The first unlocked position 540 can include the first member 210 and the second member 220 free to pivot about an axis formed by the pin 510. The pin 510 can be located in a first position relative to the slot 420. The first member 210 can slide along an axis relative to the second member 220 so that the mechanical attachment device 202 goes into a second unlocked position 542. The second unlocked position 542 can include the first member 210 and the second member 220 free to pivot about an axis formed by the pin 510. The pin 510 can be located in a second position relative to the slot 420. The first member 210 can rotate about an axis formed by the pin 510 so that the mechanical attachment device 202 goes into a locked position 544. In the locked position 544, the first locking member 520 and the second locking member 530 are restricted from pivoting about an axis formed by the pin 510. The locked position 544 can include a first position of the pin 510 in the slot 420 which can lock the first member 210 to the second member 220 of the mechanical attachment device 202. The first unlocked position 540 or the second unlocked position 542 can include a second position of the pin 510 in the slot 420 which can release the first member 210 to the second member 220 of the mechanical attachment device 202.

The mechanism to lock the mechanical attachment device 202 can include a mechanical lock, latch, hook, tumbler lock, adhesive, pin, fastener, magnetic lock, or electromagnetic lock. The mechanism to lock the mechanical attachment device 202 can be electronically, magnetically, or mechanically controlled.

Figure 6:
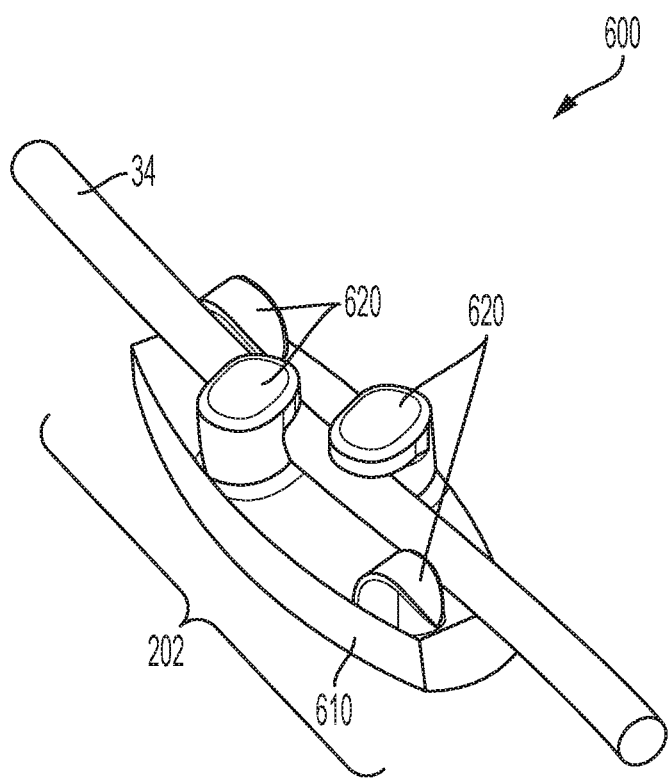
FIG. 6 depicts a system to removably couple a mechanical attachment device to a cable, in accordance with some implementations.

FIG. 6 depicts a system to removably couple a mechanical attachment device to a cable. The system 600 can include a mechanical attachment device 202. The mechanical attachment device 202 can include a plurality of protrusion 620 disposed on a base 610. The protrusions 620 can be arranged in such a way as to allow a cable 34 run through the arrangement of protrusions 620. The protrusions 620 can be arranged in such a way as to allow the cable 34 to slide freely along the base 610 when the tension on the cable 34 is below a threshold. However, when the tension in the cable 34 is greater than the threshold, the location and configuration of protrusions 620 can cause the coefficient of friction between the protrusions 620 and the cable 34 to increase and prevent the cable 34 from sliding freely along the base 610.

Figure 7:
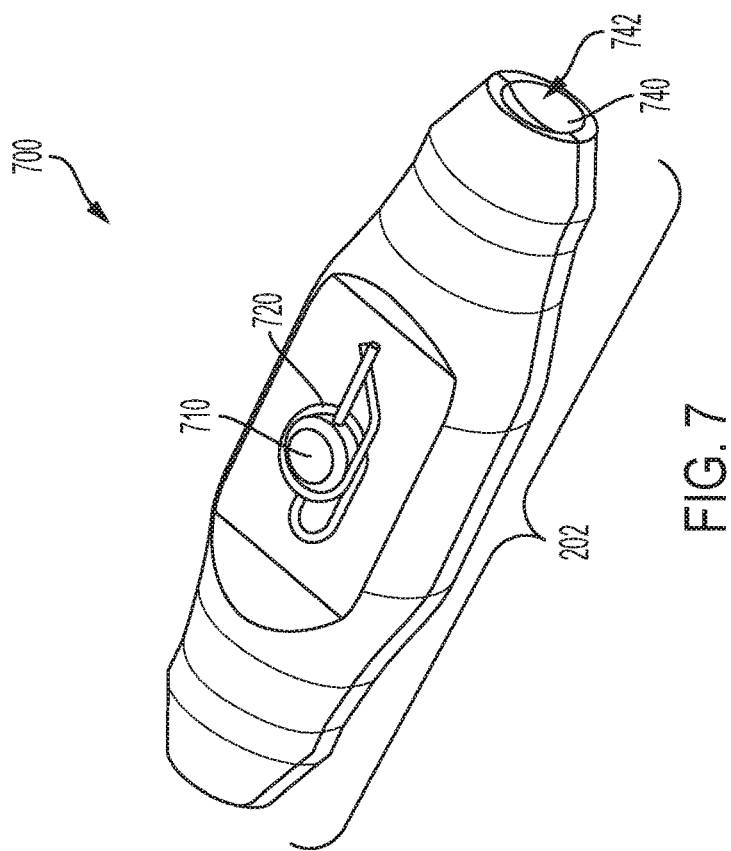

FIG. 7 depicts a system to removably or semi-permanently couple a mechanical attachment device to a cable. The system 700 can include a mechanical attachment device 202. The mechanical attachment device 202 can include a center post 710 which can hold a retaining ring 720. The mechanical attachment device 202 can be held together by a retaining ring 720. A retaining ring 720 can be installed into a groove on the center post 710 to hold the mechanical attachment device 202 together. The system 700 can include a cavity 742 formed by the parts of the mechanical attachment device 202. The system 700 can include an opening 740 which can allow a seismic data acquisition unit cable 34 to thread through the mechanical attachment device 202.

Figure 8:
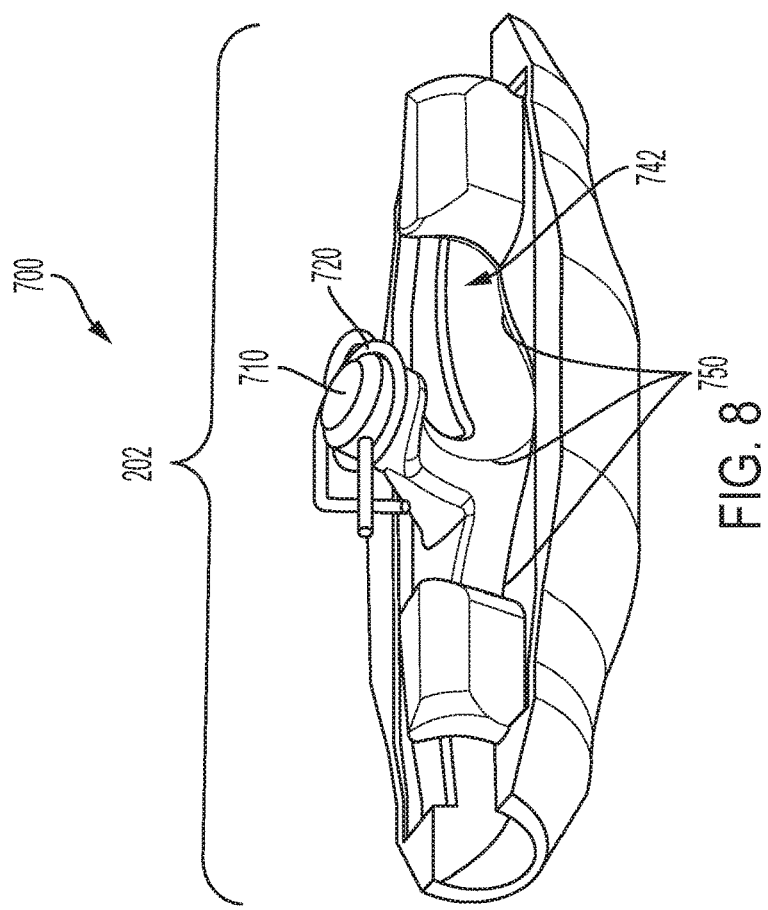
FIGS. 7-8 depict a system to removably couple a mechanical attachment device to a cable, in accordance with some implementations.

FIG. 8 depicts a system to removably or semi-permanently couple a mechanical attachment device to a cable. The system 700 can include the mechanical attachment device 202 illustrated in FIG. 7. The mechanical attachment device 202 can include a plurality of protrusions 750 within the cavity 234. The protrusions 750 can be arranged in such a way as to allow a cable 34 run through the arrangement of protrusions 750. The protrusions 750 can be arranged in such a way as to allow the cable 34 to slide freely inside the cavity 742 when the tension on the cable 34 is below a threshold, and prevent the cable 34 from sliding freely inside the cavity 742 when the tension is greater than the threshold.

Figure 9:
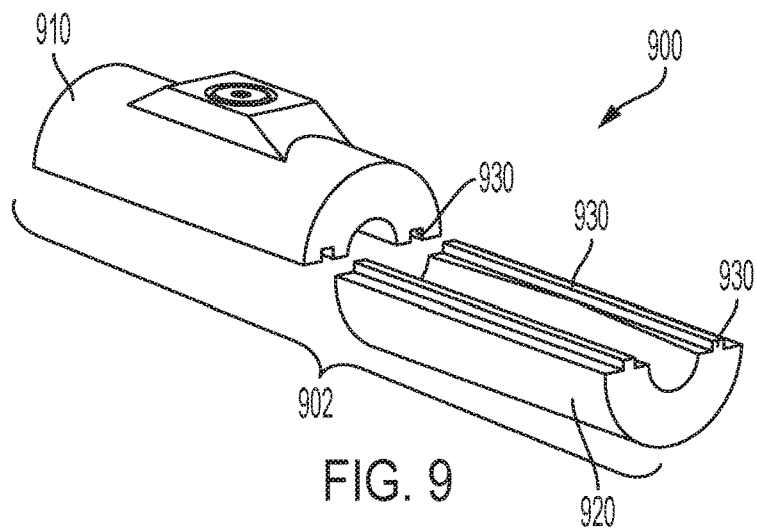
FIGS. 9-11 depict a system to removably couple a mechanical attachment device to a cable, in accordance with some implementations.

FIG. 9 depicts a system to removably or semi-permanently couple a mechanical attachment device to a cable. The system 900 can be a substitute for system 200. The system 900 can include a mechanical attachment device 902 that comprises a first member 910 and a second member 920. The first member 910 can couple to the second member 920 by sliding along grooves 930 located on the first member 910 and the second member 920.

Figure 10:
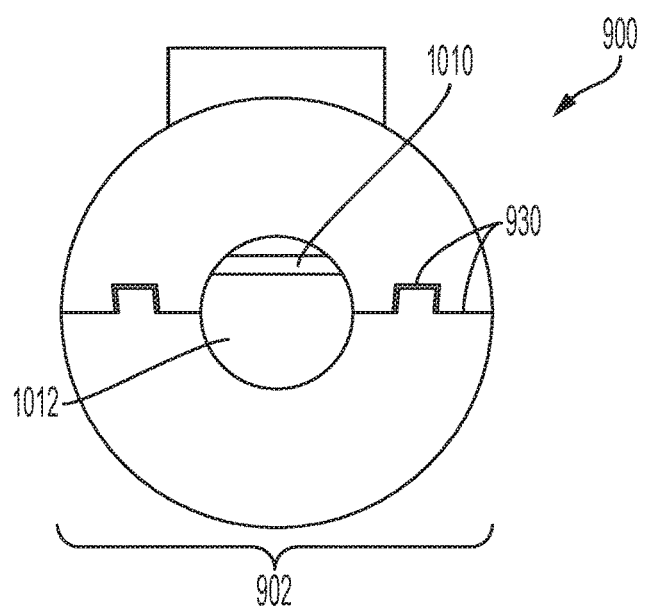

FIG. 10 depicts a system to removably or semi-permanently couple a mechanical attachment device to a cable. The system 900 can include the mechanical attachment device 902 illustrated in FIG. 9. The mechanical attachment device 202 device can include groves 930 located on the first member 910 and the second member 920. The grooves can be angled dovetail grooves to securely hold the first member 910 to the second member 920. The mechanical attachment device can include a cavity 1012 formed by the first member 910 and the second member 910. The cavity 1012 can have a diameter sufficient to allow a cable 34 to run through the cavity 1012. The mechanical attachment device 202 can include a sliding gate 1010. The sliding gate 1010 can be a protrusion (similar to those in FIGS. 2-6) which can assist in gripping a cable 34 when tension on the cable 34 exceeds a threshold.

Figure 11:
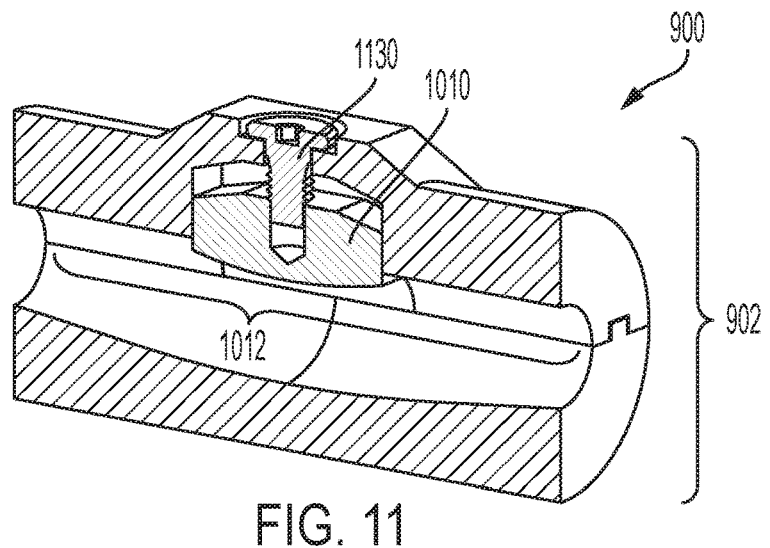

FIG. 11 depicts a system to removably or semi-permanently couple a mechanical attachment device to a cable. The system 900 can include the mechanical attachment device 902 illustrated in FIGS. 9 and 10. The mechanical attachment device 202 can include a bolt 1130 coupled to the sliding gate 1010. The bolt can be twisted to lower and raise the sliding gate, thereby providing a protrusion which can assist in gripping a cable 34 when tension on the cable 34 exceeds a threshold.

Figure 12:
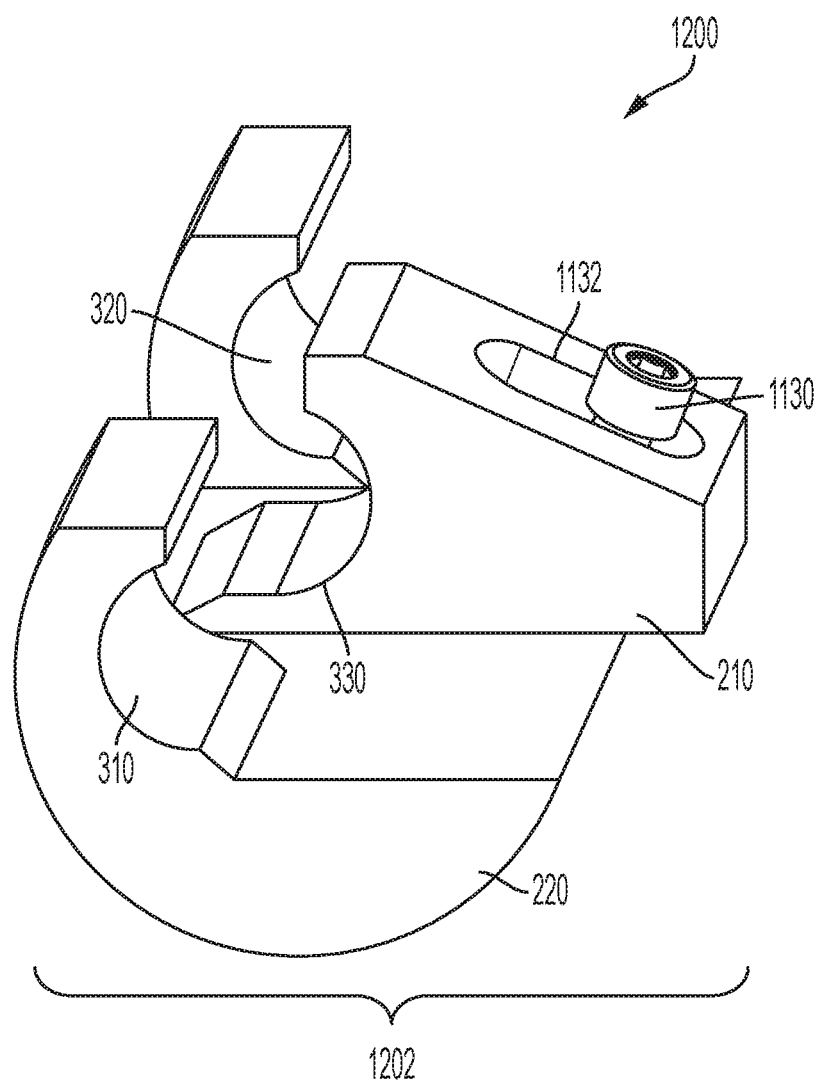
FIG. 12 depicts a system to removably couple a mechanical attachment device to a cable, in accordance with some implementations.

FIG. 12 depicts a system to removably or semi-permanently couple a mechanical attachment device to a cable. The system 1200 can include a mechanical attachment device 1202. The mechanical attachment device 1202 can replace the mechanical device 202 in system 200. The system 1200 can include a plurality of protrusions, including a first protrusion 310, a second protrusion 320, and a third protrusion 330. The first protrusion 310 and the second protrusion 320 can be disposed on the second member 220. The third protrusion 330 can be disposed on the first member 210.

The first member 210 can slide along the second member 220 by the tightening or loosening of a bolt 1130 located in a slot 1132 on the first member 210. Sliding the first member 210 to different positions along the second member 220 changes the positions of the third protrusion 330 relative to the first protrusion 310 and second protrusion 320. The relative positions of the first protrusion 310, second protrusion 320, and third protrusion 330 contribute to the friction a cable 34 can experience as it slides along the protrusions.

Figure 13:
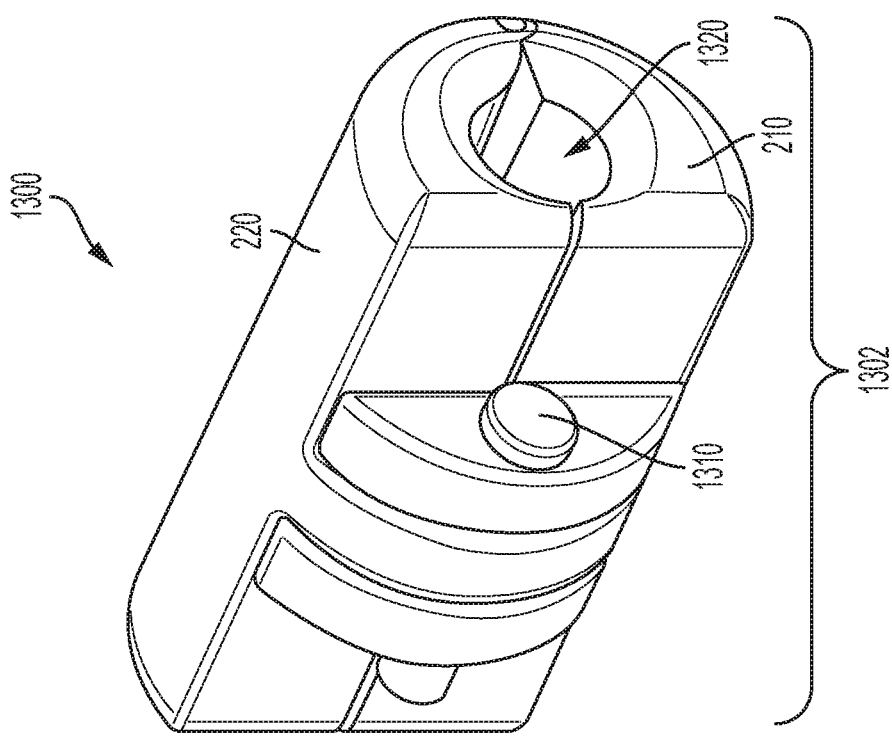

FIG. 13 depicts a system to removably or semi-permanently couple a mechanical attachment device to a cable. The system 1300 can include a slide-in mechanical attachment device 1302. The slide-in mechanical attachment device 1302 can be used in a manner similar to the mechanical attachment device 202 in system 200. The slide-in mechanical attachment device 1302 can include a slide pin 1310 which can hold the first member 210 and the second member 220 in a locked position. The slide-in mechanical attachment device 1302 can include a cavity 1320 formed by the first member 210 and the second member 220. The cavity 1320 can allow a cable 34 to run through the interior of the slide-in mechanical attachment device 1302.

Figure 14:
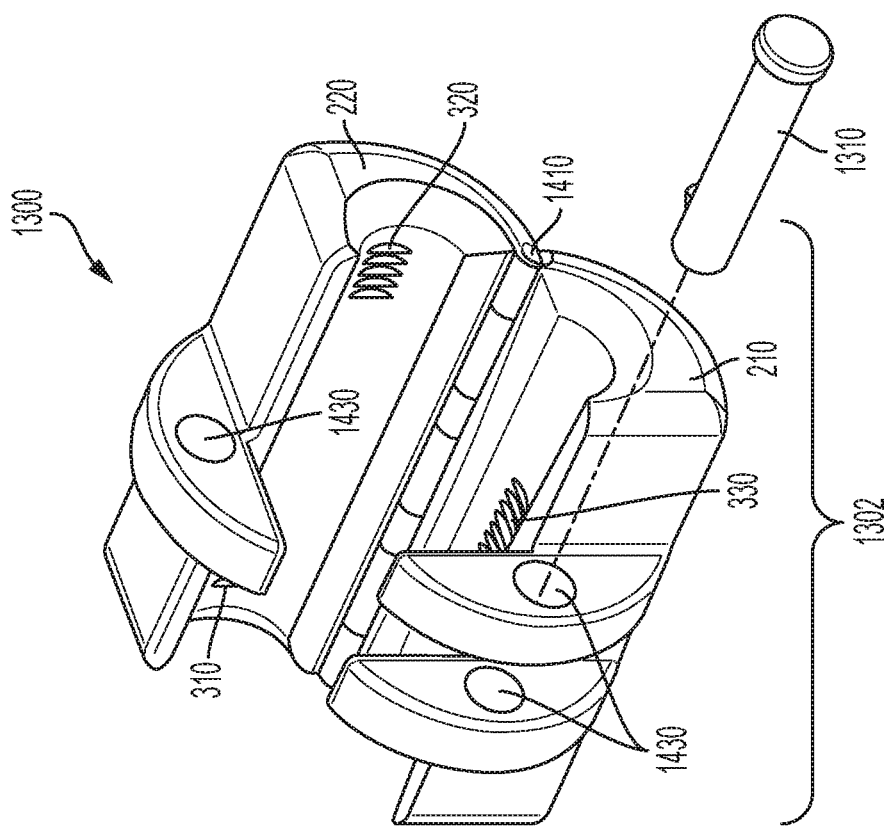
FIGS. 13-14 depict a system to removably couple a mechanical attachment device to a cable, in accordance with some implementations.

FIG. 14 depicts a system to semi-permanently couple a mechanical attachment device to a cable. The system 1300 can include the slide-in mechanical attachment device 1302 illustrated in FIG. 13. The mechanical attachment device 202 can include a plurality of pin slots 1430 located on the first member 210 and the second member 220. The slide pin 1310 can be inserted through the plurality of pin slots 1430 to lock the first member 210 to the second member 220. The first member 210 and the second member 220 can pivot about an axis formed by a hinge 1410 while the first member 210 and the second member 220 are in an unlocked position. A first protrusion 310 can be located on the second member 220. A second protrusion 320 can be located on the second member 220 a distance away from the first protrusion 310. A third protrusion 330 can be located on the first member 210 a distance away from the axis formed by the hinge 1410.

The first protrusion 310, second protrusion 320, third protrusion 330, and any additional protrusions may be of various shapes and forms. The protrusions can be a series of textured bumps protruding from the surfaces on which they are located. The series of bumps can increase the friction on a cable 34 that is thread through the cavity 1320 formed by the first member 210 and the second member 220.

Figure 15:
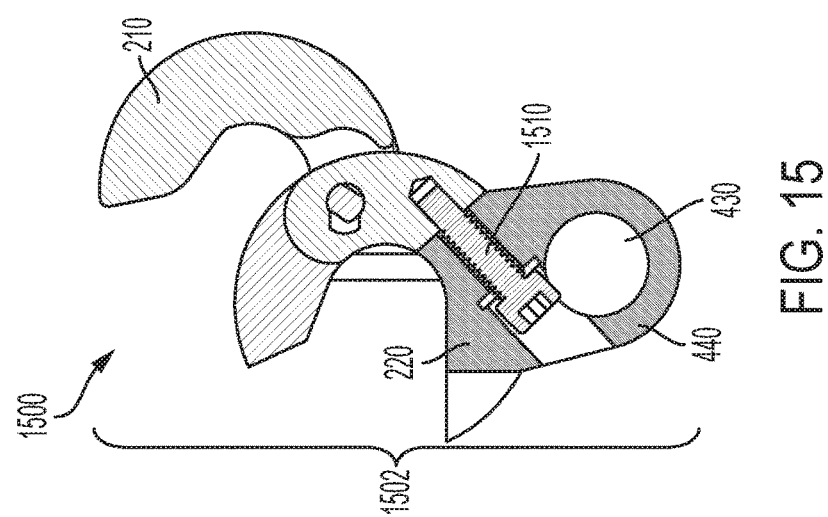

FIG. 15 depicts a system to semi-permanently couple a mechanical attachment device to a cable. The system 1500 can include a mechanical attachment device 1502. The mechanical attachment device 1502 can replace the mechanical device 202 in system 200. The mechanical attachment device can include a bolt 1510 that attaches the components of the second member 220 together. The mechanical attachment device 1502 can include a lanyard loop 440 which includes an opening 430. The mechanical attachment device 1502 can include an opening 430 extending away from a portion of the mechanical attachment device 202, the opening to receive a lanyard 32.

Figure 16:
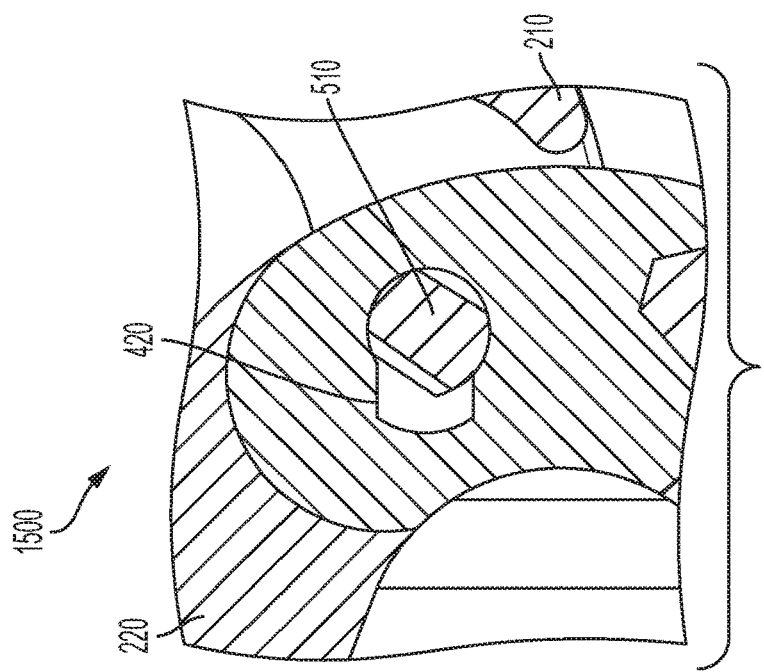

FIG. 16 depicts a system to removably or semi-permanently couple a mechanical attachment device to a cable. The system 1500 can include the mechanical attachment device 1502 depicted in FIG. 15. The mechanical attachment device 1502 can include a slot 410 and a pin 510. The slot 410 can be configured in a way to allow the pin 510 to freely pivot about an axis, thereby allowing the first member 210 to freely pivot about an axis. The pin 510 can be shaped in a way that allows the pin 510 to freely pivot about an axis but allows the first member 210 to lock to the second member upon a lateral movement of the pin 510. The slot 420 can include a hole that is shaped to accommodate a pivot of the pin 510 within the slot 420.

Figure 17:
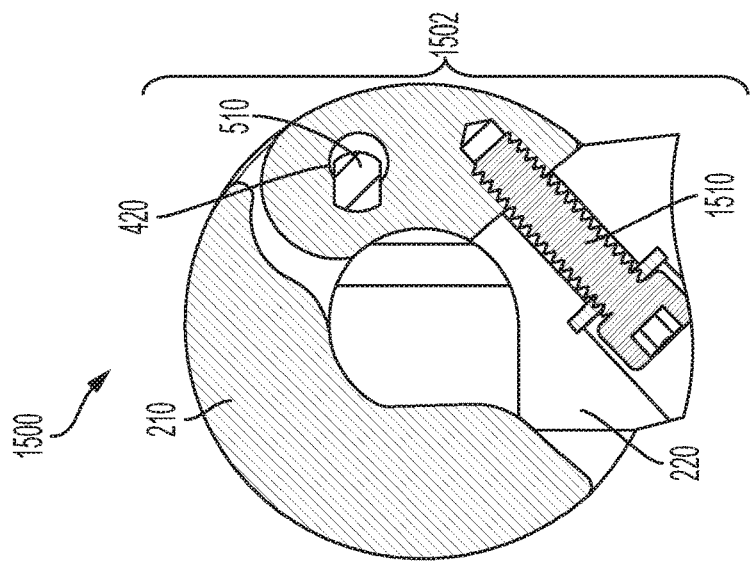
FIGS. 15-19 depict a system to removably couple a mechanical attachment device to a cable, in accordance with some implementations.

FIG. 17 depicts a system to removably or semi-permanently couple a mechanical attachment device to a cable. The system 1500 can include the mechanical attachment device 202 depicted in FIGS. 15 and 16. The mechanical attachment device can exist in a locked position whereby the first member 210 and the second member 220 are unable to pivot about an axis with respect to one another.

Figure 18:
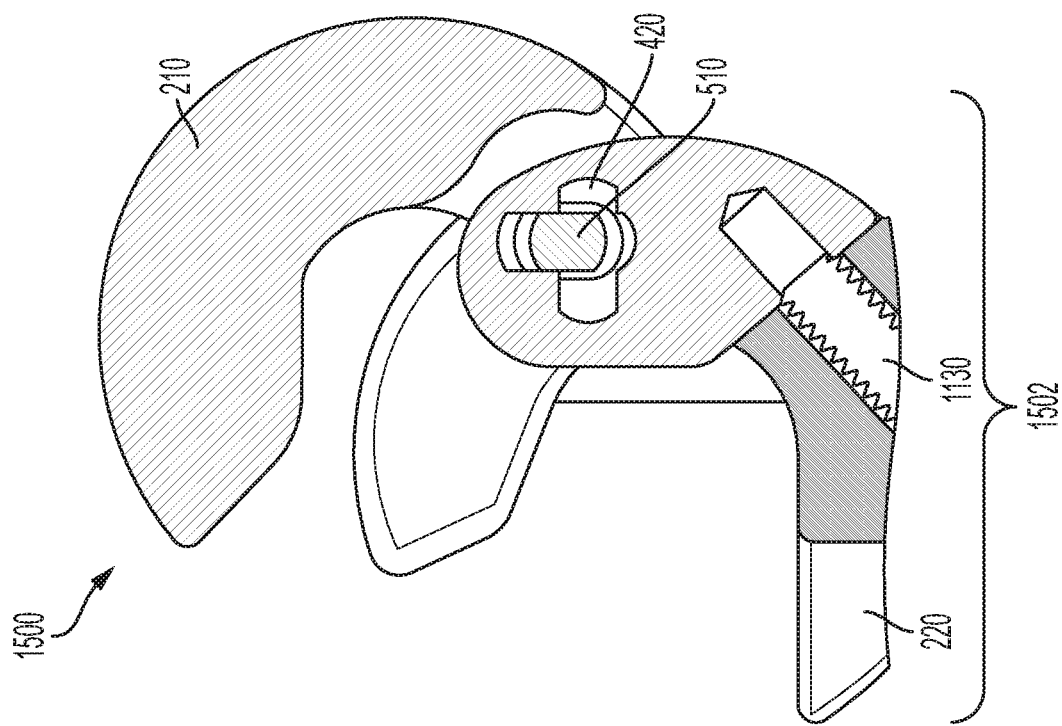

FIG. 18 depicts a system to semi-permanently couple a mechanical attachment device to a cable. The system 1500 can include the mechanical attachment device 1502 depicted in FIGS. 15-17. The system 1500 shows a variation of a pin 510 shape and a slot 420 shape that allows the first member 210 to be locked in an open position with respect to the second member 220. The slot 420 has a vertical drop to accomplish a dual-locking goal.

Figure 19:
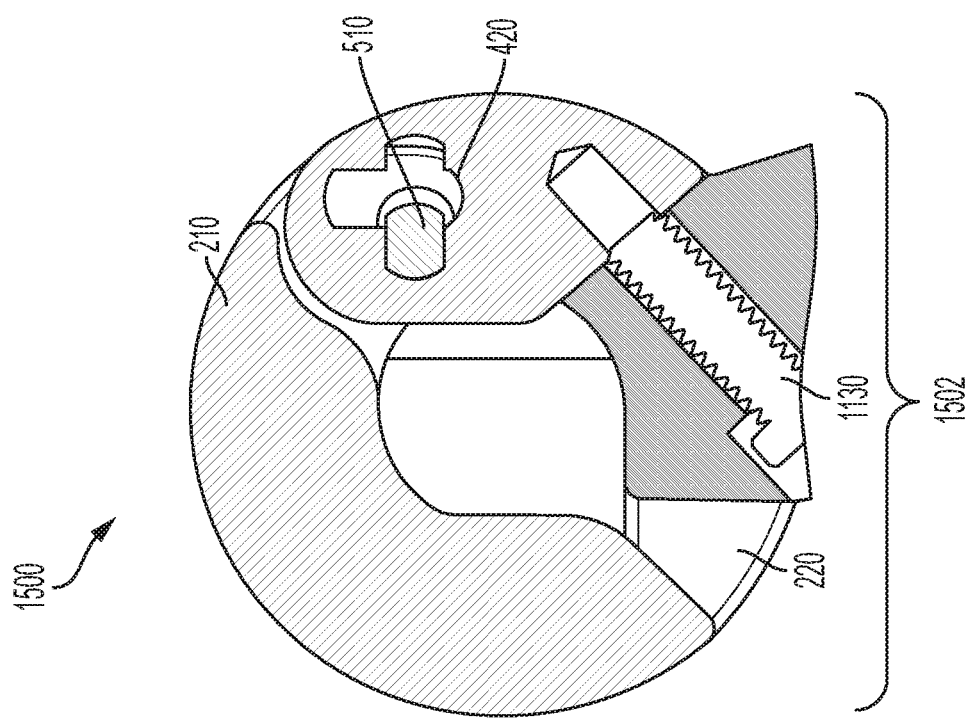

FIG. 19 depicts a system to semi-permanently couple a mechanical attachment device to a cable. The system 1500 can include the mechanical attachment device 1502 depicted in FIGS. 15-18. The pin 510 can also be moved to a position in the slot 420 that allows the first member 210 to be locked in a closed position with respect to the second member 220.

Figure 20:
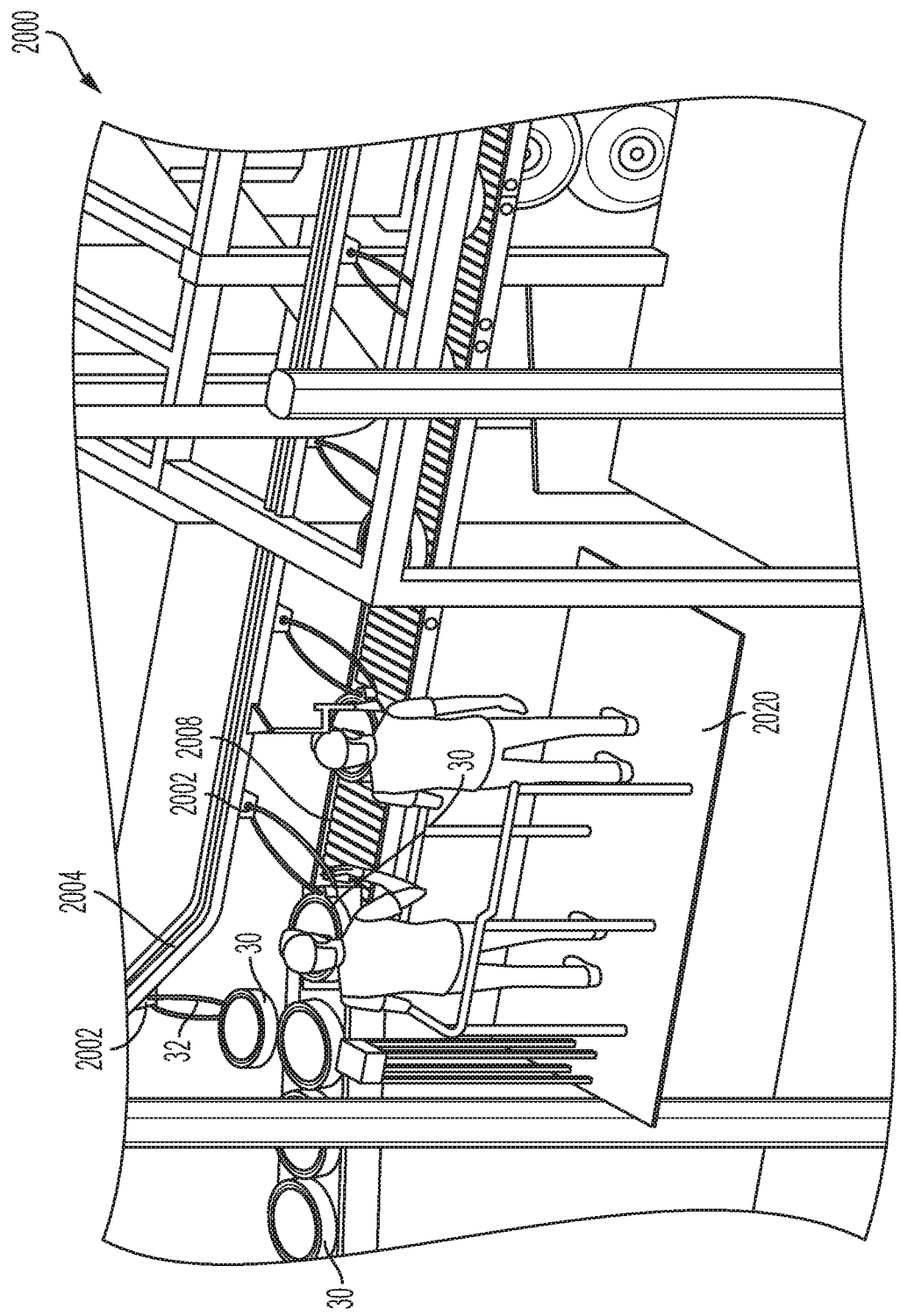
FIG. 20 depicts a system to mount seismic data acquisition units for deployment from a marine vessel, in accordance with some implementations.

FIG. 20 depicts a system to mount seismic data acquisition units for deployment from a marine vessel. The system 2000 can be one part of the deployment system 26 as illustrated in FIG. 1. The system 2000 can include a first conveyor 2004. The first conveyor 2004 can be an overhead conveyor 2004. The overhead conveyor 2004 can include one or more rails. The elevated conveyor 2004 can be a motorized overhead conveyor. The system 2000 can include a mechanical attachment device 2002, such as the mechanical attachment device 202 depicted in FIG. 2, the mechanical attachment device 902 depicted in FIG. 9, the mechanical attachment device 1202 depicted in FIG. 12, the mechanical attachment device 1302 depicted in FIG. 13, or the mechanical attachment device 1502 depicted in FIG. 15. The first conveyor 2004 can convey, transfer, transport, move, hold, or store the mechanical attachment device 2002, the mechanical attachment device 2002 with the lanyard 32, or the cable 34 without any attachments.

The first conveyor 2004 can move the cable 34. The cable 34 can get to the handling deck 2020 without any attachments. When it arrives at the handling deck 2020, a person or multiple people can attach the mechanical attachment device 2002, lanyard 32, and seismic acquisition unit 30 to the cable 34. The first conveyor 2004 can move the cable 34 so the cable 34 gets to the handling deck 2020 with a mechanical attachment device 2002 already attached. When the cable 34 and the mechanical attachment device 2002 arrive at the handling deck 2020, a person or multiple people can attach the lanyard 32 and the seismic acquisition device 30 to the mechanical attachment device 2002 located on the cable 34. The first conveyor 2004 can move the cable 34 so the cable 34 gets to the handling deck 2020 with a mechanical attachment device 2002 and lanyard 32 already attached. When the cable 34 and the mechanical attachment device 2002 with the lanyard 32 arrive at the handling deck 2020, a person or multiple people can attach the seismic acquisition device 30 to the mechanical attachment device 2002 with the lanyard 32 located on the cable 34. The first conveyor 2004 can move the cable with a mechanical attachment device 2002, lanyard 32 and seismic acquisition unit 30 attached straight to deployment without the need for a handling deck 2020 in a fully automated fashion.

The system 2000 can include a second conveyor 2008. The second conveyor 2008 can convey, transfer, transport, move, hold, or store seismic data acquisition units 30, seismic data acquisition units 30 including lanyards 32, or seismic acquisition units including lanyards 32 and mechanical attachment devices 2002. The second conveyor 2008 can be different from the first conveyor 2004. The second conveyor 2008 can be referred to as a lower conveyor or a seismic data acquisition unit conveyor. The second conveyor 2008 can include a chute conveyor, wheel conveyor, gravity roller conveyor, powered roller conveyor, chain conveyor, slat conveyor, flat belt conveyor, magnetic belt conveyor, troughed belt conveyor bucket conveyor, or tow conveyor. The second conveyor 2008 can be formed of one or more portions or pieces that are placed next to each other or joined together. The distance between the portions of the second conveyor 2008 can allow seismic data acquisition units 30, seismic data acquisition units 30 including lanyards 32, or seismic acquisition units including lanyards 32 and mechanical attachment devices 2002 to traverse the portions of the second conveyor 2008 without causing damage or friction to adversely affect the deployment process or a component of the seismic data acquisition unit 30.

The second conveyor 2008 can transport the seismic data acquisition unit 30, seismic data acquisition units 30 including lanyards 32, or seismic acquisition units including lanyards 32 and mechanical attachment devices 2002. The first conveyor 2004 and the second conveyor 2008 can be separated by a predetermined distance. The first conveyor 2004 and the second conveyor 2008 can be separated by a distance corresponding to a dimension of the seismic data acquisition unit 30 attached to the mechanical attachment device 2002 by a lanyard 32 without having to lift the seismic data acquisition unit 30 off the second conveyor 2008. To improve the efficiency and speed of deploying seismic data acquisition units 30, while reducing resource usage, the first and second conveyors 2004 and 2008 can be separated by a distance that allows the seismic data acquisition unit 30 to connect to the lanyard 32, the lanyard 32 to connect with the mechanical attachment device 2002, or the mechanical attachment device 2002 to connect with the cable 34 with minimal adjustment or additional movement.

For any of the aforementioned embodiments of the mechanical attachment devices 2002 shown in FIGS. 1-20, a machine could be configured to thread a cable 34 through the mechanical attachment device. The vessel 5 can include a device to reduce tension on the rope, the device configured to close the mechanical attachment device 2002, wherein the tension on the cable 34 increases subsequent to an interlock between the first member 210 and the second member 220 to lock the mechanical attachment device 2002 at a desired location on the cable 34. A system to deploy seismic data acquisition units 30 from a marine vessel 5 can include a system wherein the seismic data acquisition units 30 are deployed off the vessel 5 and into an aqueous medium.

To control, monitor, manage, or otherwise manipulate one or more component, module or aspect of the systems and methods depicted in FIGS. 1-20, including, for example, the mechanical attachment device, the movement of the components of the mechanical attachment device, a computer program (also known as a program, software, software application, script, or code) can be written in any form of programming language, including compiled or interpreted languages, declarative or procedural languages, and it can be deployed in any form, including as a standalone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

To control, monitor, manage, or otherwise manipulate one or more component, module or aspect of the systems and methods depicted in FIGS. 1-20, including, for example, the mechanical attachment device, the movement of the components of the mechanical attachment device, one or more processors suitable for the execution of the computer program include, by way of example, both general and special purpose microprocessors, and any one or more processors of any kind of digital computer. The processor can receive instructions and data from a read only memory or a random access memory or both. The elements of a computer are a processor for performing actions in accordance with instructions and one or more memory devices for storing instructions and data. A computer can include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Any references to implementations or elements or acts of the systems and methods herein referred to in the singular can include implementations including a plurality of these elements, and any references in plural to any implementation or element or act herein can include implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or implementation, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation or implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Additional elements other than 'A' and 'B' can also be present.

In the claims, as well as in the specification above, all transitional phrases such as "comprising," "including," "carrying," "having," "containing," "involving," "holding," "composed of," and the like are to be understood as open-ended, i.e., to mean including but not limited to. Only the transitional phrases "consisting of" and "consisting essentially of" shall be closed or semi-closed transitional phrases, respectively.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system to deploy seismic data acquisition units off a vessel to perform a seismic survey in an aqueous environment, comprising:
   a mechanical attachment device comprising:
      a first member coupled to a second member via a pin that extends through the first member and the second member, the first member configured to pivot about an axis formed by the pin;
      a cavity formed by interlocking the first member and the second member, the cavity to receive a rope that extends through the cavity;
      a first protrusion located on a first portion of the second member, the first protrusion disposed in the cavity;
      a second protrusion located on a second portion of the second member, the second protrusion disposed in the cavity and separated from the first protrusion by a distance;
      a third protrusion located between the first protrusion and the second protrusion, the third protrusion disposed in the cavity at a distance away from an axis formed by the first protrusion and the second protrusion, an arrangement of the first protrusion, the second protrusion and the third protrusion to increase a coefficient of friction between the rope and the mechanical attachment device responsive to an increase in tension in the rope; and an opening that extends away from a portion of the mechanical attachment device, the opening to receive a lanyard;

the lanyard to couple a seismic data acquisition unit to the mechanical attachment device via the opening; and the mechanical attachment device configured to move freely along the rope responsive to the tension in the rope being less than a threshold, and the mechanical attachment device further configured to lock to the rope responsive to the tension in the rope being greater than or equal to the threshold, the tension in the rope being greater than or equal to the threshold causes an increase in the coefficient of friction between the first protrusion, the second protrusion, and the third protrusion and the rope such that the mechanical attachment device grips onto the rope and prevents the mechanical attachment device from sliding relative to the rope.

2. The system of claim 1, wherein the rope lacks an attachment feature on the rope.

3. The system of claim 1, comprising:
a fourth protrusion between the first protrusion and the second protrusion on a same side as the third protrusion.

4. The system of claim 1, comprising:
a machine configured to thread the rope through the mechanical attachment device.

5. The system of claim 1, comprising:
a first locking member at an end of the first member; and
a second locking member at an end of the second member, the second locking configured to interlock with the first locking member.

6. The system of claim 5, wherein the first locking member and the second locking member are semi-permanently interlocked.

7. The system of claim 1, comprising:
a slot to receive the pin,
wherein a first position of the pin in the slot locks the first member to the second member of the mechanical attachment device, and
wherein a second position of the pin in the slot releases the first member from the second member of the mechanical attachment device.

8. The system of claim 1, comprising:
a device on the vessel to reduce tension on the rope, the device configured to close the mechanical attachment device, wherein the tension on the rope increases subsequent to an interlock between the first member and the second member to lock the mechanical attachment device at a desired location on the rope.

9. The system of claim 1, wherein the mechanical attachment device is attached to the rope prior to deployment of the seismic acquisition device.

10. The system of claim 1, wherein the mechanical attachment device is removed from the rope subsequent to retrieval of the seismic acquisition device.

11. The system of claim 1, comprising:
a back deck on the vessel, the back deck including a spool of rope,
wherein the mechanical attachment device is attached to the rope as the rope is reeled out.

12. The system of claim 11 wherein the seismic data acquisition unit is deployed off the vessel and into an aqueous medium.

13. A method of attaching seismic data acquisition units to a rope aboard a vessel to perform a seismic survey in an aqueous environment, comprising:
providing a mechanical attachment device, the mechanical attachment device comprising:
a first member coupled to a second member via a pin that extends through the first member and the second member, the first member configured to pivot about an axis formed by the pin;
a cavity formed by interlocking the first member and the second member, the cavity to receive a rope that extends through the cavity;
a first protrusion located on a first portion of the second member, the first protrusion disposed in the cavity;
a second protrusion located on a second portion of the second member, the second protrusion disposed in the cavity and separated from the first protrusion by a distance;
a third protrusion located between the first protrusion and the second protrusion, the third protrusion disposed in the cavity at a distance away from an axis formed by the first protrusion and the second protrusion, an arrangement of the first protrusion, the second protrusion and the third protrusion to increase a coefficient of friction between the rope and the mechanical attachment device responsive to an increase in tension on the rope; and
an opening that extends away from a portion of the mechanical attachment device, the opening to receive a lanyard;
the mechanical attachment device configured to move freely along the rope responsive to the tension in the rope being less than a threshold, and the mechanical attachment device further configured to lock to the rope responsive to the tension in the rope being greater than or equal to the threshold,
the tension in the rope being greater than or equal to the threshold causes an increase in the coefficient of friction between the first protrusion, the second protrusion, and the third protrusion and the rope such that the mechanical attachment device grips onto the rope and prevents the mechanical attachment device from sliding relative to the rope;
attaching the mechanical attachment device to the rope;
coupling the lanyard to the mechanical attachment device via the opening of the mechanical attachment device;
attaching a seismic data acquisition unit to the lanyard; and
deploying the seismic data acquisition unit into the aqueous environment.

14. The method of claim 13, comprising:
threading, by a machine on the vessel, the rope through the mechanical attachment device.

15. The method of claim 13, comprising:
providing a first locking member at an end of the first member; and
providing a second locking member at an end of the second member, the second locking member configured to interlock with the first locking member.

16. The method of claim 13, comprising:
moving the pin to a first position in a slot to lock the first member to the second member of the mechanical attachment device; and
moving the pin to a second position in the slot to release the first member from the second member of the mechanical attachment device.

17. The method of claim 13, comprising:
reducing, by a device on the vessel, the tension on the rope;
closing, by the device, the mechanical attachment device; and
increasing, by the device, the tension on the rope to closing the mechanical attachment device to lock the mechanical attachment device at a desired location on the rope.

18. The method of claim 13, comprising:
attaching, during a deployment operation, the mechanical attachment device to the rope.

19. The method of claim 13, comprising:
removing, during a retrieval operation, the mechanical attachment device from the rope.

\* \* \* \* \*